(12) United States Patent
Troisi et al.

(10) Patent No.: US 9,599,503 B2
(45) Date of Patent: Mar. 21, 2017

(54) CHECKWEIGHING DEVICE, SYSTEM, AND METHOD OF OPERATION

(71) Applicant: Mettler-Toledo, LLC, Columbus, OH (US)

(72) Inventors: David A. Troisi, Ithaca, NY (US); Eric A. Inglin, Ithaca, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 82 days.

(21) Appl. No.: 14/723,666

(22) Filed: May 28, 2015

(65) Prior Publication Data

US 2016/0349102 A1     Dec. 1, 2016

(51) Int. Cl.
*B07C 5/18* (2006.01)
*B07C 5/32* (2006.01)
*G01G 11/00* (2006.01)
*G01G 17/00* (2006.01)
*G01G 21/00* (2006.01)

(52) U.S. Cl.
CPC ............. *G01G 11/003* (2013.01); *B07C 5/18* (2013.01); *B07C 5/32* (2013.01); *G01G 17/00* (2013.01); *G01G 21/00* (2013.01)

(58) Field of Classification Search
CPC ...... G01G 11/003; G01G 15/00; G01G 17/00; G01G 21/00; B07C 5/18; B07C 5/32
See application file for complete search history.

(56) References Cited

U.S. PATENT DOCUMENTS

| | | | | |
|---|---|---|---|---|
| 3,627,127 A | * | 12/1971 | Whiteford | B07C 5/28 209/566 |
| 3,857,488 A | * | 12/1974 | Le Cren | B07C 5/18 177/185 |
| 4,440,249 A | | 4/1984 | Del Rosso | |
| 4,442,910 A | | 4/1984 | Mikami | |
| 5,004,093 A | * | 4/1991 | Blezard | G01G 15/00 141/170 |
| 5,092,414 A | * | 3/1992 | Blezard | G01G 15/00 141/129 |
| 5,193,630 A | * | 3/1993 | Cane | G01G 15/00 177/145 |
| 5,340,949 A | * | 8/1994 | Fujimura | G01G 19/393 141/128 |

(Continued)

*Primary Examiner* — Randy Gibson
(74) *Attorney, Agent, or Firm* — Standley Law Group LLP

(57) ABSTRACT

A checkweighing device, checkweighing systems employing one or more checkweighing devices, and methods of operation thereof. The checkweighing devices are designed for installation between parallel, spaced apart and vertically offset infeed and outfeed conveyors. Each checkweighing device includes a weighing cell with a weighing platform; a slide chute and at least one sorting gate for directing items either to the outfeed conveyor or to a discard receiver; and a power-actuated rake for sweeping incoming items from the infeed conveyor to the weighing platform, and sweeping weighed items from the weighing platform to the slide chute. While in no way limited to such a use, exemplary checkweighing device, system and method embodiments are well-suited for automatically checking the individual weights of small articles of high value, and/or other items that need to be weighed with high accuracy.

16 Claims, 2 Drawing Sheets

(56) References Cited

U.S. PATENT DOCUMENTS

| | | | | |
|---|---|---|---|---|
| 5,806,287 | A * | 9/1998 | Trechsel | G01G 15/001 177/52 |
| 6,096,983 | A * | 8/2000 | Ozaki | G01G 15/00 141/103 |
| 6,627,826 | B2 * | 9/2003 | Cavina | B65B 43/52 141/83 |
| 6,800,818 | B2 * | 10/2004 | Balboni | G01G 15/00 141/83 |
| 7,004,331 | B2 * | 2/2006 | Tew | B07C 5/18 209/592 |
| 8,222,543 | B2 * | 7/2012 | Grundtvig | B65B 5/105 177/145 |
| 8,459,092 | B2 * | 6/2013 | Inglin | G01G 23/01 73/1.13 |
| 2004/0176874 | A1 | 9/2004 | Kvisgaard et al. | |

* cited by examiner

CHECKWEIGHING DEVICE, SYSTEM, AND METHOD OF OPERATION

TECHNICAL FIELD

Exemplary embodiments according to the disclosure are directed to a modular weighing device configured for installation in a production line to check the individual weights of items, particularly but not limited to, small articles of high value and/or other items that need to be weighed with high accuracy.

BACKGROUND

Weighing devices may be used as quality control tools in a manufacturing facility, for example in a government mint, where the accurate weight of coins is of concern for several reasons. In particular if the coins are of a precious metal such as gold or silver, underweight coins would be objectionable to the public as representing less than full value, while overweight coins would be considered lost profit (commonly referred to as give-away) by the manufacturer. General-circulation coins, too, have to conform to specified weight tolerance limits, even though they are generally made of inexpensive alloys and/or laminates and their material value is usually lower than the face value of the coin, since out-of-tolerance coins could fail to work in coin-operated devices of any kind, such as parking meters, coin washers, vending machines, automated supermarket terminals and the like. Also, inconsistent coin weights could cause miscounts on counting-by-weight scales.

The weighing of mass-produced items in a production line is a well-known quality control function in many industries, for example to ensure the correct fill weight of packages in a food-processing plant. The standard solution for this kind of application is a so-called weighing conveyor or conveyor belt scale as described and illustrated, for example, in U.S. Pat. No. 4,440,249. A compact and self-contained belt conveyor is supported by one or more weighing cells which, in turn, are mounted on a support frame. This entire assembly is placed inline between an incoming and an outgoing transport conveyor, also referred to as infeed conveyor and outfeed conveyor. The weight of every item traveling down the production line is thus being checked while the item is moving over the weighing conveyor.

For reasons that are inherent in its working principle, this otherwise widely used kind of inline conveyor scale could not be considered for the task of checking the weights of smaller items such as, for instance, coins. Primarily, such a conveyor scale would be totally outside its realistic performance range when attempting to measure the small weights of bullion coins (typically in the range of 0.1 to 1.0 ozt, i.e., 3.1 to 31 grams, with a $2\sigma$-precision of $\pm 2$ mg to $\pm 5$ mg), considering in particular, that this weighing precision would have to be achieved on top of a large dead load represented by the belt conveyor, and furthermore in the presence of vibrations from the motor and moving parts of the conveyor.

On the other hand, the precise weighing of coins in the aforementioned weight range is a simple routine task when performed manually on a commercially available laboratory balance displaying weight in grams to three or four decimal places. To the applicant's knowledge, this is in fact how freshly minted bullion coins or medals are being checked in government or commercial mint facilities. Although the aforementioned weighing precision can easily be met or even exceeded, the manual weighing of individual coins on a laboratory balance is a tedious, labor-and cost-intensive activity, and therefore a prime candidate for automation.

SUMMARY

In light of the above-described need for automation, exemplary embodiments according to the invention are directed to automated checkweighing devices for weighing items in a production line, such as but not limited to coins or medals in a production line of a mint facility, wherein the checkweighing device is to deliver the same precision as a manual weighing process on a conventional laboratory balance, while substantially improving the efficiency and economy of the weight-checking process. As a further objective, exemplary embodiments may also be directed to a conveyor line system that incorporates one or more exemplary checkweighing devices, as well as a method for the operation of such a system.

Throughout the following description of checkweighing devices and checkweighing device elements, as well as in the claims, expressions such as "top", "bottom", "horizontal", and "vertical" always relate to the operation-ready position of the respective checkweighing device elements in an installed state.

Exemplary embodiments of a modular checkweighing device according to the invention are designed for installation and use between parallel infeed and outfeed conveyors that are spaced apart at a horizontal distance as well as with a vertical offset relative to each other, wherein the infeed conveyor has a transport surface located at a higher level than the transport surface of the outfeed conveyor. An exemplary checkweighing device may include a weighing cell with a weighing platform, a power-actuated rake, a slide chute and at least one sorting gate. In the installed state of such an exemplary checkweighing device between an infeed conveyor and outfeed conveyor, the weighing platform is arranged laterally adjacent to and substantially level with the transport surface of the infeed conveyor. The slide chute adjoins an opposite side of the weighing platform and leads to the outfeed conveyor. The rake is arranged to work in a transverse direction of the infeed conveyor, performing the functions of sweeping incoming items from the transport surface of the infeed conveyor over to the weighing platform, and sweeping items that have been weighed from the weighing platform to the slide chute. The slide chute includes or may be configured as the at least one sorting gate, directing items either to the outfeed conveyor, or to at least one discard receiver.

In some exemplary embodiments, the discard receiver may comprise at least one catch bin. Alternatively, a discard receiver could also be configured as a conveyor to carry the discarded items, for example, back to an upstream point of the production line, to be recycled and made into new items.

In an exemplary configuration, the slide chute itself may form the at least one sorting gate, being configured as a power-actuated hinged flap that is arranged over the discard receiver and operable to be raised if the weight of an item has been found to be out of tolerance, so as to cause an item that is being raked off the weighing platform to drop into the discard receiver.

If the out-of-tolerance items are to be sorted into two or more reject classes, for example overweight and underweight classes, the chute may be equipped with a corresponding plural number of sorting gates that may be configured as power-actuated hinged flaps. In this manner, each flap is arranged over a separate discard receiver and operable to be raised if the weight of an item has been found within a reject class associated with the respective flap and discard receiver, thereby causing an item that is being raked off the weighing platform to drop through the open flap into the selected discard receiver.

In exemplary embodiments of a checkweighing device, the rake may have a push/pull actuator to push and retract the rake in a direction transverse to that of the infeed conveyor, and a lift actuator to raise and lower the rake. During retraction, the lift actuator lifts the rake off the weighing platform and the infeed conveyor surface. Prior to the next push phase, the lift actuator lowers the item rake back onto the infeed conveyor surface.

In an exemplary configuration, the rake may have a first sweeper element and a second sweeper element, which are rigidly connected to each other and are arranged to follow each other in the sweeping direction. In the push phase of the rake, the first sweeper element serves to sweep a weighed item off the weighing platform and the second sweeper element serves to simultaneously sweep a next-to-be-weighed item from the infeed conveyor to the weighing platform. During the retraction phase, the rake is lifted far enough off the weighing platform to avoid collision of the rake with the next-to-be-weighed item on the weighing platform as well as with any item moving through an area on the infeed conveyor that is swept by the rake.

In an exemplary embodiment where the rake is lowered back onto the infeed conveyor immediately at the end of the retraction phase, the rigidly connected first and second sweeper elements may be configured with a free passageway therebetween to allow items to pass and continue their downstream movement on the infeed conveyor.

In a particular exemplary embodiment, a checkweighing device according to the disclosure is configured as a checkweighing device for weighing coins. Due to the relatively small thickness of coins compared to their diameter, the rake does not have to be lifted as far as for thicker items to avoid a collision.

In certain exemplary embodiments, the first and second sweeper elements may be V-shaped. A V-shaped sweeper element that causes an item being swept to seat itself in the bottom of the V may be especially advantageous when coins have to be weighed. In such an embodiment, a coin will center itself in the bottom of the V while being swept. As a result, reproducible positioning of coins on the weighing platform is achieved.

In exemplary embodiments, a checkweighing device according to the invention further includes a controller and a sensor, wherein the sensor serves to detect an item that is arriving on the infeed conveyor into the area swept by the rake, and the controller is programmed to receive a detection signal from the sensor as well as weight data and a stability status signal from the weighing device. The controller may be adapted to send operating commands to the push/pull and lift actuators of the rake and to the at least one sorting gate, and to process and output the weight data.

In an exemplary configuration where a checkweighing device is equipped with its own controller and sensor, the checkweighing device, after mechanical installation between an infeed conveyor and an outfeed conveyor, may be capable of operating autonomously, independently of other checkweighing devices that may be installed between the same infeed conveyor and outfeed conveyor, and independently of external control.

Exemplary embodiments according to the disclosure also cover a checkweighing system that includes an infeed conveyor, an outfeed conveyor, and at least one checkweighing device, wherein the at least one checkweighing device is not equipped with its own controller and sensor, but wherein the checkweighing system as a whole has one central controller, one sensor and one encoder. In such an embodiment, the sensor may be located at the infeed conveyor, upstream of the at least one checkweighing device, and serves to detect the presence of an item arriving on the infeed conveyor. The encoder may be attached to the infeed conveyor and adapted to detect a current position of the infeed conveyor. The controller may be programmed to receive a detection signal from the sensor, a position signal from the encoder, and weight data and a stability status signal from the at least one checkweighing device. In response to the detection signal, position signal, weight data and stability status signal, the controller may send operating commands to the rake and the at least one sorting gate of the at least one checkweighing device, and process and output the weight data.

An exemplary embodiment of a checkweighing system with a central controller, one sensor and one encoder for the entire system, may include a plurality of checkweighing devices. In such an embodiment, the central controller may be programmed, based on the detection signal, the position signal and the weight data, to keep track of the locations of all items present at any one time on the infeed conveyor and on the weighing devices, to send operating commands to the respective push/pull and lift actuators of the rakes and to respective sorting gates of the checkweighing devices, and also to process and output the respective weight data received from each checkweighing device.

Exemplary embodiments of the invention further include a method of operating an autonomously operable checkweighing device, as described above, wherein the controller of the checkweighing device receives inputs comprising weight data and a stability status signal from the weighing cell of the checkweighing device, as well as an item detection signal from the sensor. In such an embodiment, the controller may perform arithmetic and logic operations based on said inputs and, as a result of said arithmetic and logic operations, the controller may deliver outputs comprising operating commands to the at least one sorting gate actuator and to the push/pull and lift actuators of the rake.

Embodiments of the disclosure further extend to a method of operating a checkweighing system with a central controller, one detector and one encoder, as described above, wherein the central controller of the checkweighing system receives inputs comprising weight data and stability status signals from the weighing cells of the checkweighing devices, detection signals from the sensor, and position signals from the encoder. According to such methods, the controller may perform arithmetic and logic operations based on said inputs and, as a result of said arithmetic and logic operations, the controller may keep track of the location and status of all items present on the infeed conveyor and on the weighing platforms of the weighing devices, and deliver outputs comprising operating commands to the sorting gate actuators and to the push/pull and lift actuators of the rakes of the checkweighing devices.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
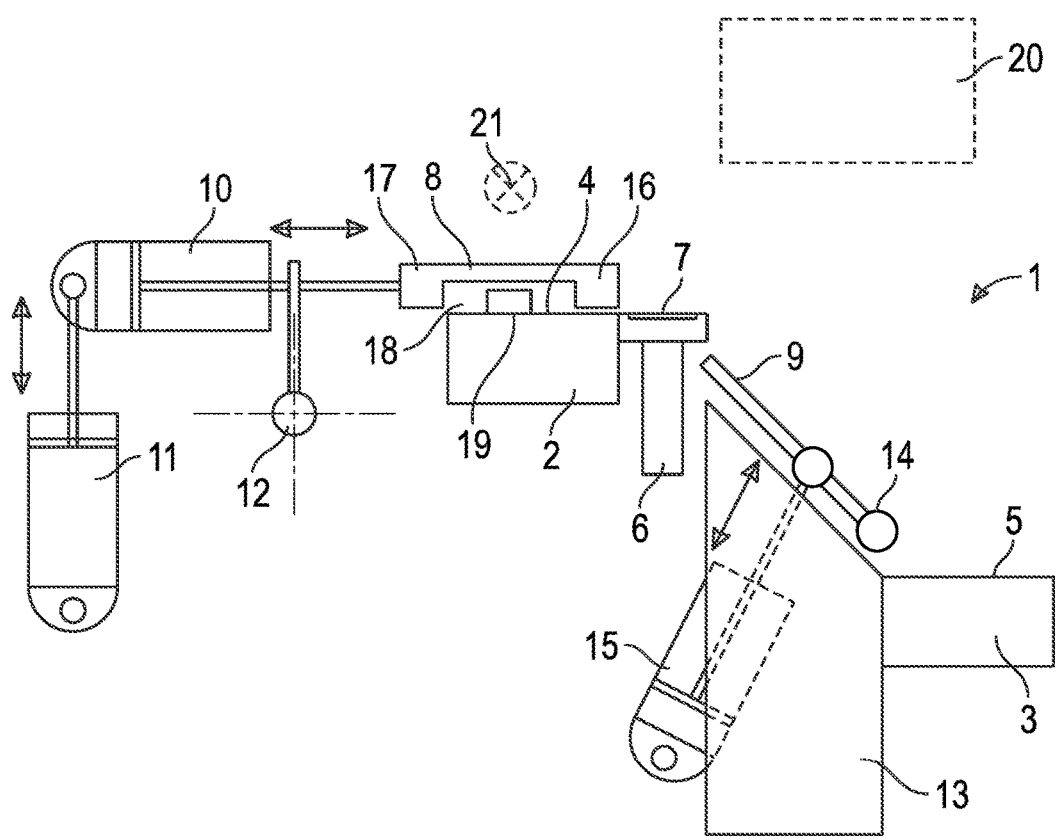
FIG. 1 schematically represents one exemplary checkweighing device according to the disclosure.

FIG. 1 schematically illustrates an exemplary checkweighing device 1 installed between an infeed conveyor 2 and an outfeed conveyor 3, which are shown here in cross-section with the transport direction oriented towards the viewer. The conveyors 2, 3 run parallel to each other, and are spaced apart at a horizontal distance as well as with a vertical offset relative to each other. The infeed conveyor 2 can be seen to have a transport surface 4 that is located at a higher level than a transport surface 5 of the outfeed conveyor 3.

The checkweighing device 1 includes a weighing cell 6 with a weighing platform 7, a power-actuated rake 8, and a slide chute 9. The rake 8 has a push/pull actuator 10 to push and retract the rake 8 in a direction transverse to the transport direction of the conveyors 2, 3. The rake 8 also has a lift actuator 11 for raising and lowering the rake 8. During retraction, the lift actuator 11 lifts the rake 8 off of the weighing platform 7 and the infeed conveyor surface 4. Prior to the next push phase, the lift actuator 11 lowers the rake 8 back onto the infeed conveyor surface 4. The lifting and lowering of the rake 8 in this example is produced by a pivoting movement of the push/pull actuator 10 about an associated fulcrum pivot 12. The slide chute 9, which is arranged over a catch bin 13 and pivoted on a hinge 14, simultaneously functions as a sorting gate or sorting flap 9 that may be raised and lowered by a sorting gate actuator 15.

Figure 2:
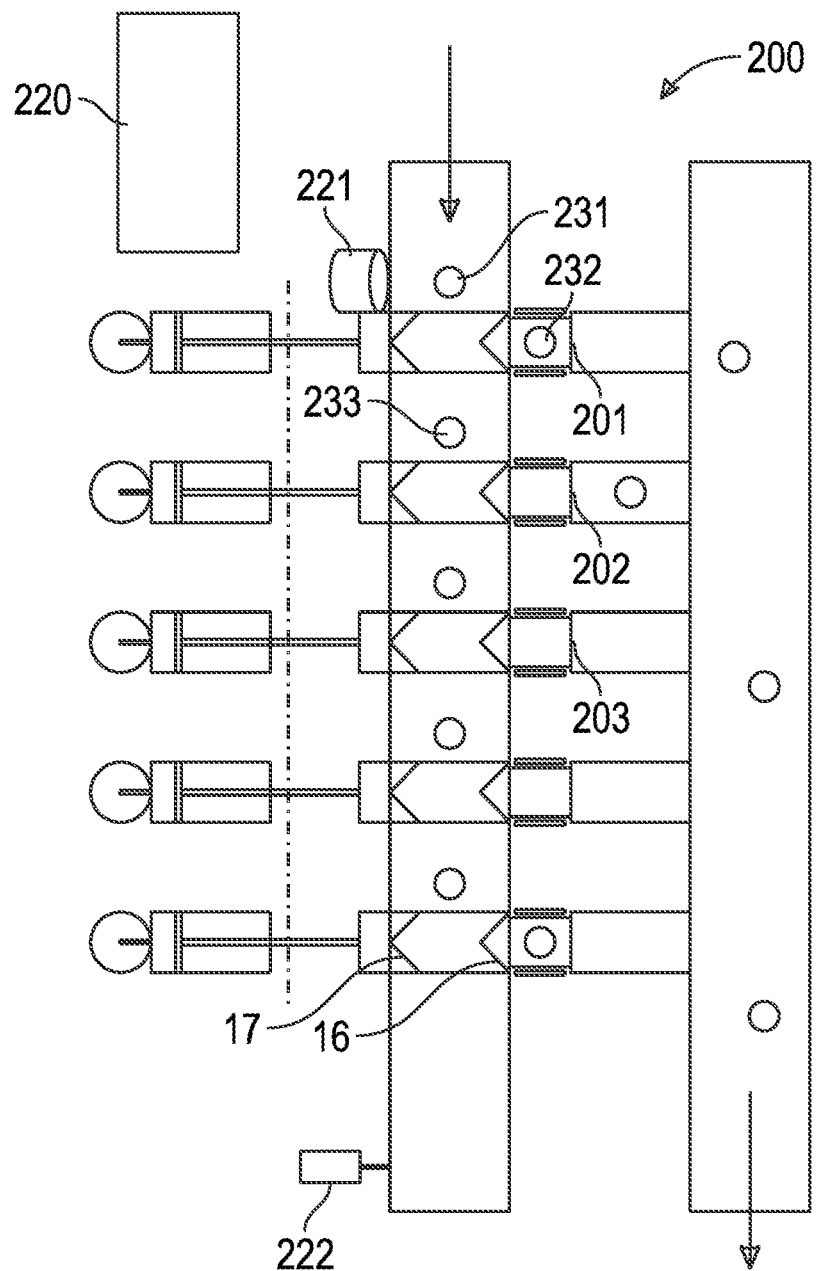
FIG. 2 schematically represents one exemplary checkweighing system having a plurality of the checkweighing devices of FIG. 1 and with a plurality of items passing through the system.

The rake 8 has a first sweeper element 16 and second sweeper element 17 following each other in the direction of the sweeping movement, i.e. the direction transverse to the transport direction of the conveyors 2, 3. As indicated in FIG. 2, the exemplary sweeper elements 16, 17 shown are V-shaped, causing an item being swept to seat itself in the bottom of the V. A clear passage 18 located between the sweeper elements 16, 17 allows an item (e.g., the coin 19 shown in FIG. 1) to continue its travel along the infeed conveyor 2 in the absence of an operating command to the rake actuators 10, 11 to perform a sweeping cycle.

If the checkweighing device 1 in FIG. 1 is equipped with its own controller 20 and detector 21 (shown with broken outlines in FIG. 1), the checkweighing device 1, after mechanical installation between the infeed conveyor 2 and the outfeed conveyor 3, is capable of operating autonomously. That is, in such an embodiment, the checkweighing device 1 would be capable of operating independently of other checkweighing devices 1 that may be installed between the same infeed conveyor 2 and outfeed conveyor 3, and also independently of external control.

To check the weight of a coin 19 arriving at the checkweighing device 1 on the infeed conveyor 2 and detected by the sensor 21, the checkweighing device 1 performs the following actions under the direction of the controller 20:

if no coin is present on the weighing platform 7 (as is the case in the example of FIG. 1), the push/pull actuator 10 moves the rake 8 forward, so that the coin 19 currently residing on the infeed conveyor surface 4 and between the sweeper elements 16, 17 of the rake 8 is swept from the infeed conveyor surface 4 to the weighing platform 7, or if a preceding coin (not shown) is present on the weighing platform 7, if the weighing of said preceding coin and determination of its accept/reject status have been completed, and if the slide chute/sorting gate 9 has been set accordingly, the push/pull actuator 10 moves the rake 8 forward, so that the coin 19 is swept from the infeed conveyor surface 4 to the weighing platform 7 and the preceding coin is pushed off the weighing platform 7 to slide down the closed slide chute 9 or fall into the catch bin 13 depending on its determined accept/reject status.

The controller 20 may also be programmed to initiate a zero-setting cycle of the weighing device 1. This may occur, for example, on start-up, at given time intervals, or after a certain number of checkweighing cycles, but only when there is no item present in the area on the infeed conveyor 2 that is swept by the rake 8.

To perform a zero-setting cycle:

if no item is present on the weighing platform 7, the current "empty platform" weight measured by the weighing cell 6 is registered either by the controller 20 or in a memory of the weighing cell 6 as the new zero reference, or if an item is present on the weighing platform 7, if the weighing of said item and determination of its accept/reject status have been completed, and if the slide chute/sorting gate 9 has been set accordingly, the push/pull actuator 10 moves the rake 8 forward, so that the item on the weighing platform 7 is pushed off the latter to slide down the closed slide chute 9 if accepted or fall into the catch bin 13 if rejected. Next, the "empty platform" weight measured by the weighing cell 6 is registered either by the controller 20 or in a memory of the weighing cell 6 as the new zero reference.

FIG. 2 illustrates a checkweighing system 200 with a plurality of checkweighing devices 201, 202, 203 installed between an infeed conveyor 2 and an outfeed conveyor 3. In contrast to the exemplary autonomous checkweighing device variation described above with respect to FIG. 1, the individual checkweighing devices 201, 202, 203 are not equipped with their own controllers and sensors. Instead, the checkweighing devices 201, 202, 203 work under a central controller 220 with one sensor 221 arranged at the infeed conveyor 2 upstream of the first checkweighing device 201 and with a position encoder 222 providing the controller with continuously updated position data of the infeed conveyor 2.

Based on the position of the infeed conveyor 2 at the time of arrival of an item 231, 232, 233 and the continuous, real-time position data, received from the position encoder 222, the central controller 220 is able to continuously keep track of the respective locations of all of the items 231, 232, 233 that are currently present in the system. In addition, the central controller 220 of the checkweighing system 200 receives weight data and stability status signals from the weighing cells of the checkweighing devices 201, 202, 203. Based on the locations of the items 231, 232, 233, and the weight data and stability status signals, the central controller 220 provides operating commands to the at least one sorting gate actuator and to the push/pull and lift actuators of the rake of each individual checkweighing device 231, 232, 233, and also initiates zero-setting cycles in the same way as the controller 20 of the autonomous checkweighing device 1 in FIG. 1.

Although exemplary device, system and method embodiments have been described through the disclosure as being applicable to weighing coins, it should be evident that device, system and method embodiments according to the invention may alternatively be used for weight-checking and sorting any articles or packages that are compatible with mechanized handling by rakes and sorting gates, and that numerous further variant embodiments could be developed from the teachings of the disclosure. For example, and without limitation, a plurality of autonomously operable checkweighing devices may be arranged in a system with a central controller, wherein the central controller may, for example, perform the functions of assigning each arriving item to a checkweighing device and of keeping records and statistics of weighing results. It is considered self-evident that variants of these kinds are to be considered as lying within the scope of the invention. Therefore, while certain exemplary embodiments have been described in detail above for purposes of illustration and explanation, the scope of the invention is not considered limited by such disclosure, and modifications are possible without departing from the spirit of the invention as evidenced by the following claims:

What is claimed is:

1. A checkweighing device for installation and use between an infeed conveyor and an outfeed conveyor that are arranged in parallel, spaced apart at a horizontal distance, and vertically offset relative to each other, wherein the infeed conveyor has a transport surface located at a higher level than a transport surface of the outfeed conveyor, the checkweighing device comprising:
    a weighing cell with a weighing platform;
    a power-actuated rake; and
    a slide chute comprising at least one sorting gate, the slide chute adapted to direct items either to the outfeed conveyor or to a discard receiver;
    wherein, in the installed state of the checkweighing device between said infeed conveyor and outfeed conveyor:
        the weighing platform is arranged laterally adjacent to and substantially level with the transport surface of the infeed conveyor,
        the slide chute adjoins an opposite side of the weighing platform and leads to the outfeed conveyor, and
        the rake is arranged to move in a direction transverse to the direction of transport of the infeed conveyor, so as to perform the functions of sweeping incoming items from the transport surface of the infeed conveyor over to the weighing platform, and sweeping items that have been weighed from the weighing platform to the slide chute.

2. The checkweighing device of claim 1, wherein the discard receiver comprises at least one catch bin.

3. The checkweighing device of claim 2, wherein the slide chute itself forms the sorting gate, the sorting gate being configured as a power-actuated, hinged flap, which is arranged over the catch bin and operable to be raised if the weight of an item being weighed on the checkweighing device is found to be out of tolerance such that an item that is raked off the weighing platform will be caused to drop into the catch bin.

4. The checkweighing device of claim 2, wherein the slide chute comprises a plurality of sorting gates that are configured as power-actuated hinged flaps, each flap being arranged over a separate catch bin and operable to be raised if the weight of an item being weighed on the checkweighing device is been found to lie within a reject class associated with the respective flap and catch bin such that an item raked off the weighing platform will be caused to drop through the open flap into said catch bin.

5. The checkweighing device of claim 1, wherein:
    the rake comprises a push/pull actuator operable in a push phase and a retraction phase, respectively, to push and retract the rake in the direction transverse to the transport direction of the infeed conveyor; and
    the rake further comprises a lift actuator operable to lift the rake off the weighing platform and the infeed conveyor surface during the retraction phase and to lower the fully retracted rake back onto the infeed conveyor surface.

6. The checkweighing device of claim 5, wherein:
    the rake comprises first and second sweeper elements that are rigidly connected to each other and are arranged to follow each other in the sweeping direction of the rake;
    in the push phase of the rake, the first sweeper element is positioned to sweep a weighed item off the weighing platform and the second sweeper element is positioned to simultaneously sweep a next-to-be-weighed item from the infeed conveyor to the weighing platform; and
    in the retraction phase of the rake, the lift actuator is adapted to lift the rake far enough off the weighing platform to permit the first sweeper element to stay clear of the next-to-be-weighed item on the weighing platform.

7. The checkweighing device of claim 5, wherein in a fully retracted position of the rake, at least a portion of the rake lying in a direct path of items moving downstream along the infeed conveyor is arranged with sufficient vertical clearance from the infeed conveyor surface to allow said items to pass under the rake and continue their downstream movement on the infeed conveyor.

8. The checkweighing device of claim 1, wherein the device is configured to weigh coins.

9. The checkweighing device of claim 8, wherein the rake includes V-shaped first and second sweeper elements that are rigidly connected to each other and are arranged to follow each other in the sweeping direction of the rake.

10. The checkweighing device of claim 1, further comprising:
    a controller and a sensor,
    the sensor operable to detect an item that is arriving on the infeed conveyor into the area thereof swept by the rake, and
    the controller programmed to:
        receive a detection signal from the sensor and weight data from the weighing cell of the checkweighing device,
        send operating commands to the push/pull actuator and the lift actuator of the rake, and to the at least one sorting gate actuator, and
        process and output the weight data.

11. A checkweighing system, comprising:
    an infeed conveyor and an outfeed conveyor that are arranged in parallel, spaced apart at a horizontal distance, and vertically offset relative to each other, the infeed conveyor having a transport surface located at a higher level than a transport surface of the outfeed conveyor; and
    at least one checkweighing device installed between the infeed conveyor and the outfeed conveyor, each checkweighing device comprising:
        a weighing cell with a weighing platform that is arranged laterally adjacent to and substantially level with the transport surface of the infeed conveyor, a power-actuated rake arranged to move in a direction transverse to the direction of transport of the infeed conveyor, so as to perform the functions of sweeping incoming items from the transport surface of the infeed conveyor over to the weighing platform, and sweeping items that have been weighed from the weighing platform to the slide chute, a slide chute adjoining an opposite side of the weighing platform and leading to the outfeed conveyor, the slide chute comprising at least one sorting gate and adapted to direct items either to the outfeed conveyor or to a discard receiver, a sensor operable to detect an item that is arriving on the infeed conveyor into the area thereof swept by the rake, and a controller programmed to receive a detection signal from the sensor and weight data from the weighing cell of the checkweighing device, to send operating commands to the push/pull actuator and the lift actuator of the rake and to the at least one sorting gate actuator, and to process and output the weight data;

wherein each checkweighing device present is operable autonomously, independently of other checkweighing devices installed in the checkweighing system, and independently of external control.

12. A checkweighing system, comprising:
(a) an infeed conveyor and an outfeed conveyor that are arranged in parallel, spaced apart at a horizontal distance, and vertically offset relative to each other, the infeed conveyor having a transport surface located at a higher level than a transport surface of the outfeed conveyor;
(b) at least one checkweighing device installed between the infeed conveyor and the outfeed conveyor, each checkweighing device comprising:
a weighing cell with a weighing platform that is arranged laterally adjacent to and substantially level with the transport surface of the infeed conveyor,
a power-actuated rake arranged to move in a direction transverse to the direction of transport of the infeed conveyor, so as to perform the functions of sweeping incoming items from the transport surface of the infeed conveyor over to the weighing platform, and sweeping items that have been weighed from the weighing platform to the slide chute, and
a slide chute adjoining an opposite side of the weighing platform and leading to the outfeed conveyor, the slide chute comprising at least one sorting gate and adapted to direct items either to the outfeed conveyor or to a discard receiver;
(c) a sensor located at the infeed conveyor and upstream of the at least one checkweighing device, the sensor operable to detect the presence of an item arriving on the infeed conveyor;
(d) an encoder attached to the infeed conveyor and operable to detect a current position of the infeed conveyor; and
(e) a central controller programmed to receive a detection signal from the sensor, a position signal from the encoder, and weight data from the at least one checkweighing device, and in response to receiving said detection signal, said position signal and said weight data, to send operating commands to the rake and the at least one sorting gate of the at least one checkweighing device, and to process and output the weight data.

13. The checkweighing system of claim 12, wherein:
a plurality of checkweighing devices are present;
the rake of each checkweighing device includes a push/pull actuator operable in a push phase and a retraction phase, respectively, to push and retract the rake in the direction transverse to the transport direction of the infeed conveyor, and a lift actuator operable to lift the rake off the weighing platform and the infeed conveyor surface during the retraction phase and to lower the fully retracted rake back onto the infeed conveyor surface; and
the controller is programmed, based on the detection signal, the position signal and the weight data, to:
keep track of a plurality of items present on the infeed conveyor and on each checkweighing device,
to selectively send operating commands to the push/pull and lift actuators of the rakes, and the at least one sorting gate of the checkweighing devices, and
to process and output weight data from the checkweighing devices.

14. A method of operating the checkweighing system of claim 11, wherein:
the controller of each autonomously operating checkweighing device receives therefrom inputs comprising weight data and a stability status signal from the weighing cell, and a detection signal from the sensor;
the controller performs arithmetic and logic operations based on said inputs; and
as a result of said arithmetic and logic operations, the controller delivers outputs comprising operating commands to the at least one sorting gate actuator and to the push/pull and lift actuators of the rake.

15. A method of operating the checkweighing system of claim 12, wherein:
the central controller of the checkweighing system receives inputs comprising:
weight data and a stability status signal from the weighing cell of the at least one checkweighing device;
detection signals from the sensor; and
position signals from the encoder;
the controller performs arithmetic and logic operations based on said inputs and, as a result of said arithmetic and logic operations, the controller:
keeps track of the location and status of all items present on the infeed conveyor and on the weighing platform(s) of the at least one checkweighing device; and
selectively delivers outputs comprising operating commands to the sorting gate actuators, and to the push/pull and lift actuators of the rakes, of the at least one checkweighing device.

16. A method of operating the checkweighing system of claim 13, wherein:
the central controller of the checkweighing system receives inputs comprising:
weight data and a stability status signal from the weighing cell of each checkweighing device;
detection signals from the sensor; and
position signals from the encoder;
the controller performs arithmetic and logic operations based on said inputs and, as a result of said arithmetic and logic operations, the controller:
keeps track of the location and status of all items present on the infeed conveyor and on the weighing platforms of the checkweighing devices; and selectively delivers outputs comprising operating commands to the sorting gate actuators, and to the push/pull and lift actuators of the rakes, of the checkweighing devices.

* * * * *